United States Patent [19]

Blair

[11] Patent Number: 4,539,387
[45] Date of Patent: Sep. 3, 1985

[54] PROCESS FOR POLYMERIZING FORMALDEHYDE

[75] Inventor: Leslie M. Blair, Parkersburg, W. Va.

[73] Assignee: E. I. Du Pont de Nemours and Company, Wilmington, Del.

[21] Appl. No.: 637,578

[22] Filed: Aug. 3, 1984

[51] Int. Cl.³ .................................................. C08G 2/08
[52] U.S. Cl. ..................................... 528/232; 528/243
[58] Field of Search .................................. 528/232, 243

[56] References Cited

U.S. PATENT DOCUMENTS

| | | | |
|---|---|---|---|
| 2,994,687 | 8/1967 | Goodman et al. | 260/67 |
| 3,718,630 | 2/1973 | Leverett | 528/243 X |
| 3,879,350 | 4/1975 | Suzuki et al. | 260/67 FP |
| 4,332,930 | 6/1982 | Tahii et al. | 528/233 |

FOREIGN PATENT DOCUMENTS 49004787  4/1972  Japan .

*Primary Examiner*—Lucille M. Phynes

[57] ABSTRACT

A diquaternary ammonium compound, especially a diquaternary ammonium diacetate in which at least one substituent of nitrogen atom is an alkyl group having at least 14 carbon atoms and the total number of carbon atoms of all nitrogen substituents is at most 44, is an excellent formaldehyde polymerization initiator, which gives large particle size polyformaldehyde in a mixture of aliphatic and aromatic hydrocarbons. Polyformaldehyde is a commercial resin suitable, among others, in applications requiring engineering resins having high strength and wear resistance.

6 Claims, 1 Drawing Figure

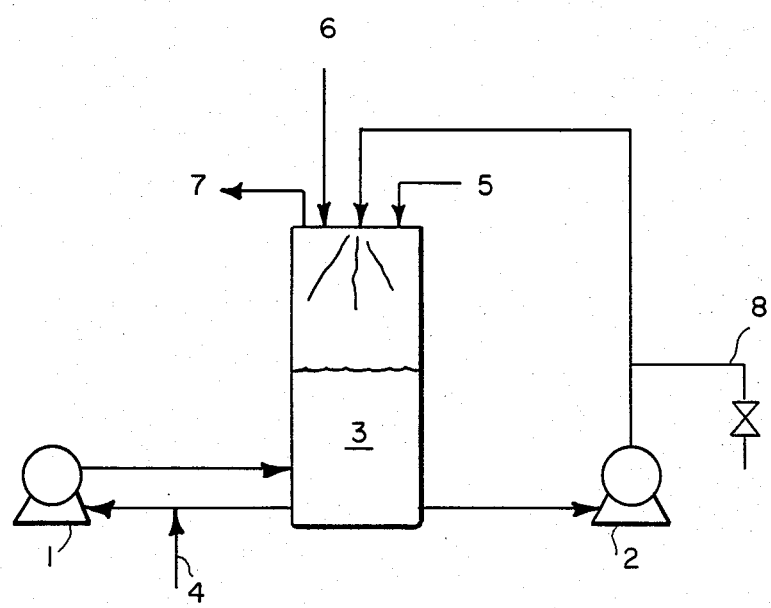

PROCESS FOR POLYMERIZING FORMALDEHYDE

BACKGROUND OF THE INVENTION

This invention relates to an improved process for polymerizing formaldehyde to a high molecular weight polyoxymethylene, and in particular to the use of an initiator which results in a product having very desirable physical properties.

High molecular weight polyoxymethylene is a well known commercial product. It can be made, for example, according to the process described in U.S. Pat. No. 2,994,687 (Goodman et al.), which involves passing dry, gaseous formaldehyde into a reactor containing a hydrocarbon solvent in which is dissolved a quaternary ammonium compound serving as the polymerization initiator. The polymer is isolated and its end groups are capped with acetic anhydride to stabilize the polymer against hydrolysis.

Various quaternary ammonium compounds can be used as initiators in this process, but salts of weak acids, especially of carboxylic aliphatic acids, are preferred because such salts are unlikely to cause polymer degradation or hydrolysis. The above-mentioned Goodman et al. patent lists a number of quaternary ammonium compounds which can be used in that process.

A typical polymerization initiator is dihydrogenated tallow dimethylammonium acetate (DHTA) which has the following formula (1)

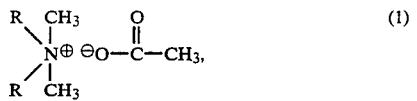

wherein each R is a hydrogenated tallow (primarily, 18 carbon atoms-containing) group.

Polymerization of formaldehyde often is carried out in the presence of a small amount of a molecular weight control agent, which can be, for example, water, methanol, or acetic anhydride. Each of these additives has certain advantages and disadvantages. For example, water gives the largest particle size but the lowest yield of the polymer. Acetic anhydride is potentially the most desirable because it caps the free hydroxyl groups right in the polymerization process and thus leads to the highest yields. On the other hand, acetic anhydride, when used in a hydrocarbon solvent, gives the smallest particle size. Yet, very small particles are difficult to handle, have a tendency to clog filters, reduce plant capacity, and require more complex drying facilities than larger particles.

It would, therefore, be of considerable industrial interest to be able to carry out formaldehyde polymerization in the usual solvents in the presence of acetic anhydride as the molecular weight control agent and still make a polyoxymethylene of acceptable particle size.

SUMMARY OF THE INVENTION

According to the present invention, there is now provided in a process for the polymerization of formaldehyde in a hydrocarbon solvent, in the presence of a molecular weight control agent, the improvement of using as the polymerization initiator a diquaternary ammonium compound of the following formula (2)

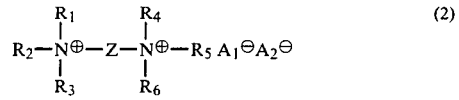

wherein Z is an aliphatic or olefinic difunctional hydrocarbon radical of 2 to 10 carbon atoms, and each of $R_1$ through $R_6$ is an alkyl radical of 1 to 20 carbon atoms, at least one of $R_1$ through $R_6$ having at least 14 carbon atoms, the total number of carbon atoms in all the $R_1$ through $R_6$ radicals being at most 44; and each of $A_1^\ominus$ and $A_2^\ominus$ independently is an anion selected from the class consisting of $C_1$-$C_{18}$ carboxylates, $OH^\ominus$, and $OR_7^-$, where $R_7$ is a $C_1$-$C_8$ alkyl.

DESCRIPTION OF THE DRAWING

The drawing is a schematic diagram of the polymerization process.

DETAILED DESCRIPTION OF THE INVENTION

The general polymerization conditions are substantially those already known to the art, for example, those described in the above-cited Goodman et al. patent. Polymerization temperature can be less than room temperature or as high as about 90° C., but the preferred temperature range is about 50°–90° C. Seed polyoxymethylene having suitable particle size normally is added to the hydrocarbon solvent prior to the start of the polymerization in an amount of at least about 50% based on the weight of the solvent. It has been found under laboratory conditions that in the absence of seed polymer at the proper concentration, the particle size of the polymer product normally was small. The polymerization runs were sufficiently long to reduce the effect of the presence of seed polymer in the product on the particle size determination.

The essence of the present invention is the use of a diquaternary compound, rather than of a monoquaternary compound, as the polymerization initiator. This substitution surprisingly results in a very significant increase of the particle size of polyoxymethylene produced in the process. Thus, in laboratory scale equipment, the particle size increased by about 400%.

A diquaternary salt which can be readily made from the corresponding commercial diquaternary dichloride, namely, N,N,N',N',N'-pentamethyl-N-tallow-1,3-diammoniumpropane diacetate (3), or DQA:

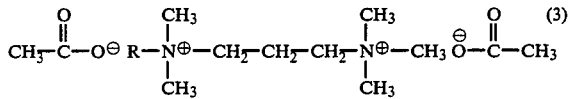

where R is the tallow (primarily $C_{18}$, unsaturated) radical, is a very good polymerization initiator.

DQA is made by anion exchange between N,N,N',N',N'-pentamethyl-N-tallow-1,3-diammoniumpropane dichloride and potassium acetate. It is commercially available as a solution, for example, a 50% solution in aqueous isopropyl alcohol. The diacetate product is taken up in a hydrocarbon and any remaining water and alcohol are removed by distillation to give a 10–50% solution of the diacetate in the hydrocarbon.

Other suitable diquaternary ammonium compounds can be made from the corresponding diamines by simple methods known to those skilled in the art. The reaction sequence can follow, for example, the pathway shown below:

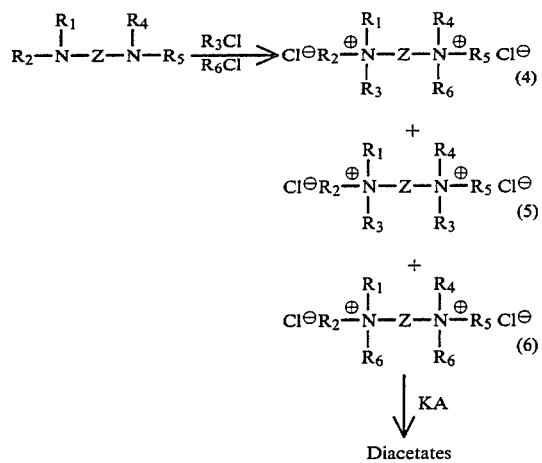

Diacetates

In practice, the starting diamine will be usually diquaternized with the same alkyl halide, so that $R_3$ and $R_6$ will be the same. Normally, the higher alkyl substituent ($C_{14}$ or higher) is already present in the diamine, and the diquaternization is carried out with a lower alkyl halide, for example, methyl chloride. However, there is no theoretical reason to limit $R_1$ through $R_6$ to any particular alkyl radicals, which can be linear, branched, or cyclic, saturated or unsaturated. Typical such alkyl radicals include, for example, ethyl, various isomeric forms of propyl, butyl, pentyl, hexyl, heptyl, octyl, decyl, dodecyl, tetradecyl, hexadecyl, octadecyl, eicosyl; 9-octadecenyl, 9,12-octadecadienyl, 9-hexadecenyl, 9,12,15-octadecatrienyl; cyclopentyl, cyclohexyl, and cycloheptyl. Diquaternary ammonium compounds in which the anion is not acetate but another alkanoate ion are made in the same manner by exchanging the chloride ion for the alkanoate, either directly as described above or by first neutralizing the chloride with an alkali metal hydroxide or alkoxide, and then passing the resulting diquaternary ammonium hydroxide of alkoxide through an ion exchange resin containing the appropriate anion, or by converting the hydroxide of alkoxide to alkanoate by exchange with a sodium or potassium alkanoate.

Typical alkanoate anions include, for example, propionate, butyrate, heptanoate, decanoate, oleate, palmitate, and stearate. Typical alkoxide anions include, for example, methoxide, 1-propoxide, 2-propoxide, 1-butoxide, and 1-hexoxide.

The polymerization process of the present invention has been carried out in a double loop arrangement, as shown in the drawing. Continuous pumping through the loops agitates the polymer slurry in the solvent in polymerization reactor. Formaldehyde is introduced through line 5 at the top of reactor 3. The molecular weight control agent and the solvent are added through line 6, while the polymerization initiator, is added through line 4 to a loop which includes pump 1, and it enters the reactor near the bottom. A second loop includes pump 2. Unpolymerized formaldehyde is vented through line 7. The polymer is recovered through line 8.

The polymerization solvent is a hydrocarbon or a mixture of hydrocarbons. When the molecular weight control agent is acetic anhydride, the best solvent system in laboratory experiments was a 90:10 wt. % mixture of heptanes with toluene. Generally speaking, open chain liquid aliphatic hydrocarbons, both normal and branched, are better than cycloaliphatic hydrocarbons, which are better than aromatic hydrocarbons. Mixtures of hydrocarbons can be used. Typical hydrocarbons include, for example, hexane, cyclohexane, a mixture of heptanes, octane, 2-methylhexane, benzene, toluene, xylene, and mixtures of two or more of the above.

Typical molecular weight control agents, in addition to acetic anhydride, methanol, and water, include also other aliphatic acid anhydrides and other alcohols, e.g., propionic anhydride, malonic anhydride, butyric anhydride, isopropyl alcohol, butyl alcohol, t-butyl alcohol, hexyl alcohol, and cyclohexyl alcohol.

This invention is now illustrated by the following representative examples of certain preferred embodiments thereof, where all parts, proportions, and percentages are by weight unless otherwise indicated.

EXAMPLE 1

To a double loop polymerization reactor there was added 1400 mL of a solvent mixture consisting of 90% of heptanes and 10% of toluene and 500 grams of seed polyoxymethylene with an average particle size of 270 microns. With vigorous agitation maintained by pumps in each of the loops (see drawing), the following flows through the reactor were started: approximately 300 g/hr of purified formaldehyde vapor, 450 g/hr of the hydrocarbon solvent, 0.00015 mole/hr of DQA and 0.0064 mole/hr of acetic anhydride.

After 4.7 hours of continuous operation, during which polymer slurry samples were taken intermittently, the experiment was stopped. A total of 1080 g of polymer was made, and the final product had a particle size of 300 microns with an inherent viscosity in hexafluoroisopropyl alcohol of 1.10.

In contrast, when identical conditions were used, with the exception that 0.000097 mole/hr of DHTA was substituted for DQA, a total of 1190 g of polymer was made during a 4.1 hour run. Particle size of the final product made in the presence of this prior art initiator was only 70 microns, and the polymer inherent viscosity in hexafluoroisopropyl alcohol was 1.23.

EXAMPLE 2

Runs analogous to those of Example 1 were made using methanol as a molecular weight control agent. With methanol (in place of acetic anhydride) added at a rate of 0.012 mole/hr, and using DQA as the initiator, a particle size of 370 microns was obtained after 2.7 hours with a polymer inherent viscosity of 1.14. In contrast, a particle size of 135 microns was obtained after 4.5 hours, when DHTA was the initiator. In that case, polymer inherent viscosity was 1.18.

EXAMPLE 3

Two runs analogous to those of Example 1 were run with water as a molecular weight control agent. For both the DQA and DHTA runs, water was added at a rate of 0.013 mole/hr. After a 4.2 hr run with the DHTA initiator, a polymer having a particle size of 200 microns and an inherent viscosity in hexafluoroisopropyl alcohol of 1.27 was obtained. In the presence of DQA, a polymer with a particle size of 320 microns and an inherent viscosity of 1.15 was obtained.

The results of Examples 1-3 are summarized in the following Table I.

TABLE I
FORMALDEHYDE POLYMERIZATION EXPERIMENTS USING DHTA OR DQA INITIATORS

| Example | Initiator Type | Addition Rate mole/hr × 10[5] | Molecular Weight Control Agent | Addition Rate mole/hr × 10[3] | Average Time Hours | Final Properties | | | |
|---|---|---|---|---|---|---|---|---|---|
| | | | | | | Poly. Rate g/hr | Seed Polymer Content % | Inherent Viscosity[a] | Particle Size by $D_{50}$, microns |
| 1 | DHTA | 9.7 | Ac$_2$O | 6.4 | 4.12 | 290 | 23 | 1.23 | 72 |
| 1 | DQA | 15 | Ac$_2$O | 6.4 | 4.67 | 230 | 27 | 1.10 | 300 |
| 2 | DQA | 15 | Methanol | 12 | 2.67 | 125 | 57 | 1.14 | 370 |
| 2 | DHTA | 9.5 | Methanol | 11 | 4.5 | — | — | 1.18 | 135 |
| 3 | DHTA | 10 | Water | 13 | 4.17 | 180 | 32 | 1.27 | 200 |
| 3 | DQA | 15 | Water | 13 | 1.67 | — | 70-75 | 1.15 | 320 |

[a] determined in hexafluoroisopropyl alcohol at 35° C. at a polymer concentration of 0.005 g/mL

COMPARATIVE EXAMPLES

Other monoquaternary ammonium initiators were used in formaldehyde polymerization run according to the same general process conditions as described in Example 1. The results are summarized in Table II below:

TABLE II

| Example No. | Cation Structure Number and type of N—alkyl groups | Anion | Results Average particle diameter (microns) or other comments |
|---|---|---|---|
| 4 | 2 hydrogenated tallow 2 methyl | acetate | 70 |
| 5 | 1 methyl 3 (C$_8$-C$_{10}$) | acetate | 55 |
| 6 | 1 hydrogenated tallow 3 methyl | acetate | 125 |
| 7 | 2 octadecyl 2 methyl | chloride | 68 |
| 8 | 2 coco 2 methyl | hydroxide | less than 70 |
| 9 | 1 hexadecyl 3 methyl | hydroxide | less than 70 |
| 10 | 4 hexyl | benzoate | less than 70 |
| 11 | 4 butyl | hydroxide | less than 70 |
| 12 | 1 coco 1 methyl 2 hydroxyethyl | hydroxide | less than 70 |
| 13 | 1 methyl 2 tallowamidoethyl 1 hydroxyethyl | methyl-sulfate | no reaction |
| 14 | 2 hydrogenated tallow 1 methyl 1 benzyl | chloride | less than 70 |
| 15 | 2 hydrogenated tallow 1 methyl 1 benzyl | chloride (caustic activated) | less than 70 |

The above examples show that monoquaternary ammonium polymerization compounds either lead to small particle size polyoxymethylene or do not sufficently activate polymerization.

I claim:
1. In a process for the polymerization of formaldehyde in a hydrocarbon solvent, in the presence of a molecular weight control agent,
the improvement of using as the polymerization initiator a diquaternary ammonium compound of the following formula

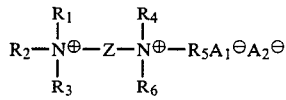

wherein Z is an aliphatic or olefinic difunctional hydrocarbon radical of 2 to 10 carbon atoms, and each of $R_1$ through $R_6$ is an alkyl radical of 1 to 20 carbon atoms, at least one of $R_1$ through $R_6$ having at least 14 carbon atoms, the total number of carbon atoms in all the $R_1$ through $R_6$ radicals being at most 44; and each of $A_1^\ominus$ and $A_2^\ominus$ independently is an anion selected from the class consisting of $C_1$-$C_{18}$ carboxylates, $OH^\ominus$, and $OR_7^\ominus$, where $R_7$ is a $C_1$-$C_8$ alkyl.

2. A process of claim 1 wherein the molecular weight control agent is an aliphatic anhydride.

3. A process of claim 2 wherein the anhydride is acetic anhydride.

4. A process of claim 3 wherein the hydrocarbon solvent is a mixture of aromatic and aliphatic hydrocarbons.

5. A process of claim 4 wherein the solvent mixture consists of about 90 wt. % of heptanes and 10 wt. % of toluene.

6. A process of claim 5 wherein the polymerization initiator is N,N,N',N',N'-pentamethyl-N-tallow-1,3-diammoniumpropane diacetate.

* * * * *